March 2, 1965

T. LINDSTROM ETAL 3,172,063

VARIABLE RELUCTANCE PICK-UP

Filed Dec. 14, 1960

INVENTORS
TURE LINDSTROM
AND ROBERT E. SPAN
BY

ATTORNEYS

INVENTORS
TURE LINDSTROM
AND ROBERT E. SPAN
BY
ATTORNEYS

United States Patent Office 3,172,063
Patented Mar. 2, 1965

3,172,063
VARIABLE RELUCTANCE PICK-UP
Ture Lindstrom, Dundee, Fla., and Robert E. Span, Rector, Pa., assignors, by mesne assignments, to the United States of America, as represented by the Secretary of the Air Force
Filed Dec. 14, 1960, Ser. No. 75,895
1 Claim. (Cl. 336—135)

The invention described herein relates generally to a variable reluctance type alternating current pick-up and more particularly to a novel pick-up having an extremely high degree of sensitivity.

Devices of the type described currently find wide application in conjunction with accelerometers, rate gyroscopes, and electromechanical gauging devices. The dynamic requirements of systems which use rate gyroscopes and accelerometers have resulted in the development of devices having stiffer centering springs and greatly reduced angular deflection. The increased sensitivity requirements of associated measuring devices necessary to compensate for such reduced angular deflection has not been satisfactorily met by any induction type pick-up known in the prior art. Low sensitivity in an inherent characteristic of the conventional inductance type pick-up wherein a maximum angular displacement is required to produce an effective pick-up output voltage.

Accordingly, it is the principal object of the present invention to provide a variable reluctance pick-up having a high degree of sensitivity and accuracy.

It is a further object of the present invention to provide a variable reluctance pick-up in which an extremely small degree of mechanical motion is transformed into a distinguishable electrical signal.

It is a further object of the present invention to provide a variable reluctance pick-up of simple construction having a high degree of sensitivity and reliability.

Other objects will appear as the specification progresses and the novel features of our invention will be particularly pointed out in the appended claim.

Referring to the drawings.

Figure 1:
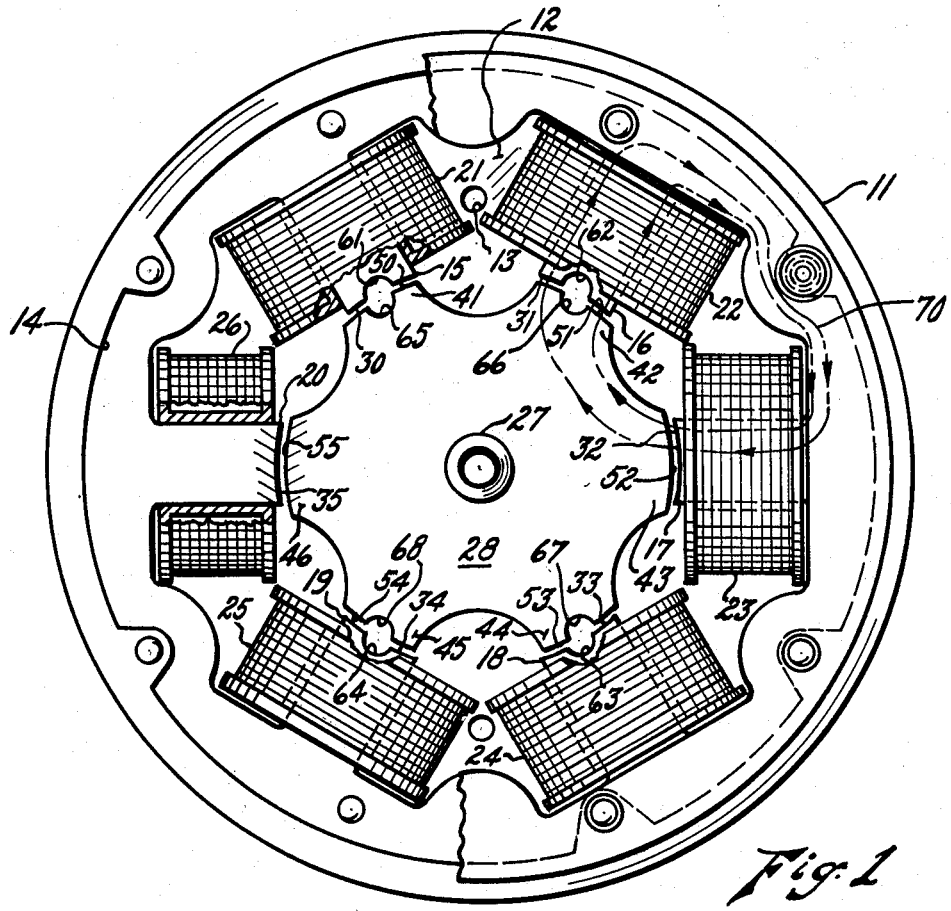
FIG. 1 is a plan view of a device embodying the subject invention.

Reference is now made to FIG. 1 in which a presently preferred embodiment of our invention is illustrated. The subject pick-up is provided with annular case 11 having mounting holes 13 located in bottom wall 12. Annular core structure 14 is fixed within case 11 in a plane perpendicular to the major axis of said case 11. Said annular core structure 14 is made of a plurality of laminations of permeable material. Poles 15–20 are inwardly projected radial extensions of annular core structure 14 having arcuate face portions 30–35, said arcuate face portions each being concaved and coinciding with an arc-circumscribed at radius R from said major axis. Wound about poles 17 and 20 are primary excitation coils 23 and 26. Secondary coils 21, 22, 24 and 25 are wound about poles 15, 16, 18 and 19, respectively.

Armature 28 is disposed within annular core structure 14 in a common plane therewith. Actuating shaft 27 which coincides with the major axis of said pick-up is rigidly affixed to said armature 28 causing it to rotate in response to externally applied angular motion. Said armature 28 consists of a plurality of stacked laminations of highly permeable material. Armature 28 is provided with protrusions 41–46, which protrusions have convex arcuate faces 50–55 being proximate to and in substantial alignment with poles 15–20, respectively. Poles 15, 16, 18 and 19 have serrations 61–64 located on said pole faces parallel to said pick-up major axis. Serrations 65, 66, 67 and 68 have been similarly located on the faces of adjacent armature protrusions 41, 42, 44 and 45, respectively. Said serrations are fundamental to the present invention and will be described in greater detail in conjunction with FIGURES 3–6. The subject pick-up as illustrated in FIG. 1 represents the physical arrangement for a null or balanced position. Flux lines 70 are shown providing equal coupling between the primary coils and both sets of secondary coils.

Figure 2:
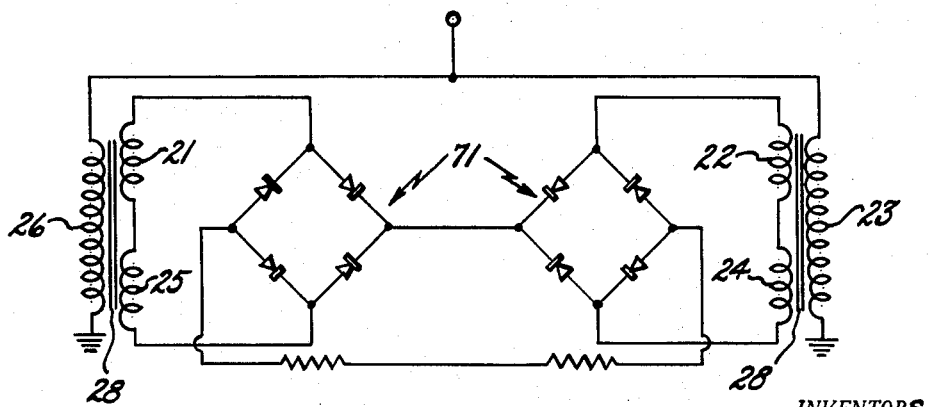
FIG. 2 is a wiring diagram of the subject invention together with its accompanying bridge circuit.

FIG. 2 illustrates the electrical connection of the subject pick-up. Primary coils 23 and 26 are connected to a 26 volt 400 cycle source. The outputs of secondary coils 21, 25 and 22, 24 are connected to bridge circuit 71 in series opposed relation in such a manner that when armature 28 is in a balanced position with respect to poles 15–20 as illustrated in FIG. 1, equal coupling between the primary coils and each secondary coil results in said secondary coils cancelling each other out, and a null or no-signal output is observed at the terminals of bridge 71.

Referring once again to FIG. 1 it is pointed out that armature 28 has the same thickness as does annular core structure 14 and pole faces 30, 31, 33 and 34 have the same area as do the adjacent armature protrusion faces 50, 51, 53 and 54. Pole faces 32 and 35 are appreciably smaller in area than adjacent armature protrusion faces 52 and 55. When the subject pick-up is in a null position as shown in FIG. 1 pole faces 32 and 35 (primary poles) are aligned with armature protrusion faces 52 and 55 while pole faces 30 and 33 are offset from armature protrusion faces 50 and 53 in a clockwise direction, and pole faces 31 and 34 are offset from armature protrusion faces 51 and 54 in a counterclockwise direction. The aforementioned off set arrangement of secondary poles and armature protrusions is so designed that the common proximate area at each pole is equal when the pick-up is in a null position, thereby affording equal low reluctance paths between primary coils 23, 26 and each secondary coil.

Any external force applied to actuating shaft 27 will cause it and armature 28 to rotate. A clockwise rotation of armature 28 causes the common proximate area between pole faces 30, 33 and armature protrusion faces 50, 53 to increase and at the same time causes the common proximate area between pole faces 31, 34 and armature protrusion faces 51, 54 to decrease. Armature protrusion faces 52, 55 being larger than their associated pole faces 32, 35 maintain a constant common proximate area. This results in a larger amount of highly permeable material being situated between primary coils 23, 26 and secondary coils 21, 24 than between said primary coils and secondary coils 22, 25, thereby permitting stronger coupling to said first mentioned secondary coils 21, 24. Stronger coupling to secondary coils 21, 24 results in an output voltage which unbalances bridge 71 and produces an output signal thereat which is proportional to the angular deflection of actuating shaft 27.

It can readily be seen that counterclockwise rotation of actuating shaft 27 would result in a similar unbalance of bridge 71 with an output signal responsive to the magnitude of said motivating force, the direction of said rotation being determinable by the sign of said output voltage.

Figure 7:
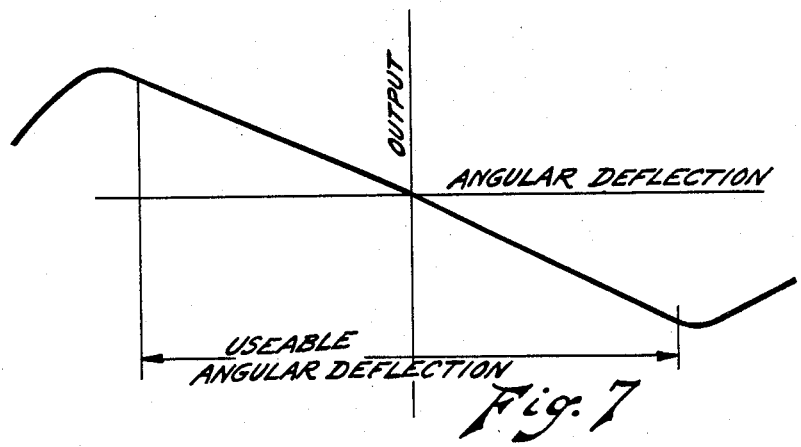
FIG. 7 illustrates a curve representing the angular deflection versus voltage output of a conventional pick-up.
Figure 8:
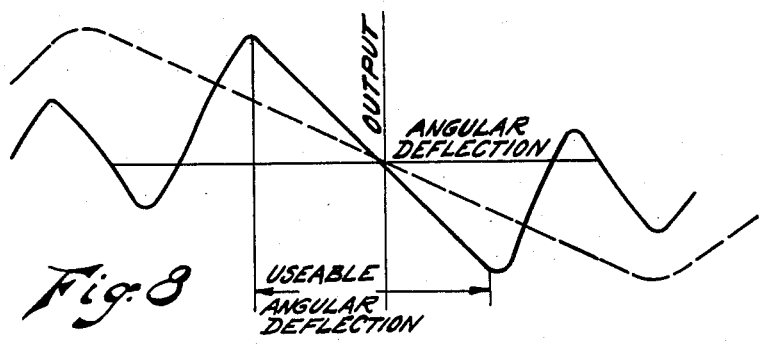
FIG. 8 illustrates a curve representing the angular deflection versus voltage output of a pick-up embodying the subject invention.
Figure 3:
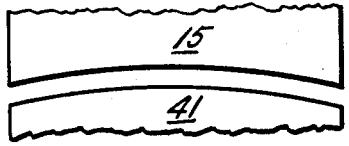
FIG. 3 illustrates the relative pole and rotor faces of a conventional pick-up, said faces being shown in direct alignment.
Figure 4:
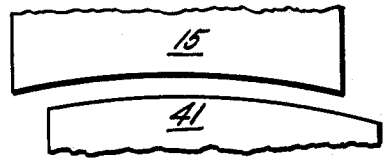
FIG. 4 illustrates the relative pole and rotor faces of a conventional pick-up shown with the rotor having 10% clockwise rotation.
Figure 5:
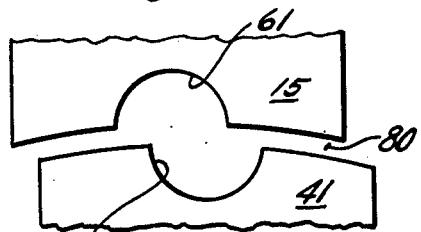
FIG. 5 illustrates the relative pole and rotor faces of a pick-up employing one embodiment of our invention.
Figure 6:
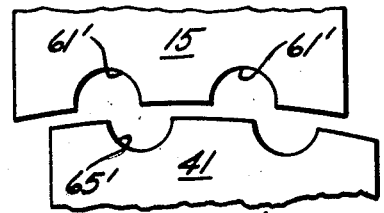
FIG. 6 illustrates the relative pole and rotor faces of a pick-up employing another embodiment of our invention.

Our invention provides an A.C. pick-up having an extremely high degree of sensitivity through the inclusion of serrations located in pole faces 30, 31, 33 and 34 and in armature protrusion faces 50, 51, 53 and 54. FIG. 3 illustrates pole face 30 and armature protrusion face 50 both having an area of 1 cm.$^2$ in direct alignment, with the common proximate area being 100% of the pole face area, thereby allowing a maximum low reluctance path. FIG. 4 illustrates a .1 cm. clockwise rotation of armature protrusion face 50 with a resulting common proximate area of .8 cm.$^2$. The low sensitivity which results from this arrangement is representative of the present state of the art. Serrations of approximately .1 cm. radius have been made in pole faces 30, 31, 33, and 34 and armature protrusion faces 50, 51, 53, and 54 in accordance with the principles of our invention as illustrated in FIGS. 5 and 6. It is apparent from an examination of FIGS. 5 and 6 that a .1 cm. clockwise rotation of armature protrusion face 41 will result in a common proximate area of .6 cm.$^2$ in the case of single serrations and .3 cm.$^2$ in the case of double serrations. The attendant rapid change in reluctance path results in a higher output voltage for any given angular deflection. FIGS. 7 and 8 illustrate curves relating angular deflection to pick-up output voltage, wherein FIG. 7 demonstrates the low sensitivity common to conventional devices and FIG. 8 demonstrates the improved characteristics of the subject invention.

While only devices having one and two serrations per pole face have been illustrated, it is pointed out that if a larger number of serrations are used the angular movement for maximum output would be further reduced. There is, of course, a practical limit on the number of serrations depending upon the serration size and pole face configuration.

The width of the serrations must be large compared with the air gap distance. Also the distance between serrations should be at least equal to the serration width in order to keep leakage flux to a minimum.

There has thus been disclosed a variable relutance type A.C. pick-up in which the several objects of this invention are achieved. It will be apparent to those skilled in the art that many modifications and changes may be made in the preferred embodiment disclosed herein without departing from the spirit and scope of the invention. It is therefore intended that the full scope of the invention be defined by the appended claim.

What is claimed is:

A highly sensitive variable reluctance pick-up comprising an annular magnetic core having a plurality of poles, each with a face area, and said face areas having varying peripheral contours, and being among said plurality of poles at least one primary pole, said primary pole being an inward radial projection of said magnetic core, and there being also among said plurality of poles two secondary poles per primary pole, said secondary poles being inward radial projections of said magnetic core each being disposed in a position equidistant from said primary pole and having at least one radial serration in each face thereof, a coil wound around said primary pole, said coil being adapted to be connected across a source of alternating current, a coil wound around each said secondary pole, said last mentioned coils being connected in series opposed relation, and an armature of permeable material having protrusions of varying peripheral contours adjacent each said primary and secondary poles, said armature being disposed to rotate within said annular magnetic core, and said protrusions adjacent said secondary poles, having at least one radial serration in each face thereof.

References Cited by the Examiner
UNITED STATES PATENTS

| | | | |
|---|---|---|---|
| 2,600,546 | 6/52 | Kimball | 336—135 |
| 2,669,126 | 2/54 | Simmons | 336—135 X. |
| 3,045,196 | 7/62 | Packard | 336—135 |
| 3,089,044 | 5/63 | Bolton | 336—135 X. |

LARAMIE E. ASKIN, *Primary Examiner.*

MILTON O. HIRSHFIELD, ORIS L. RADER, JOHN F. BURNS, E. JAMES SAX, *Examiners.*